(12) United States Patent
Iwashita

(10) Patent No.: US 7,470,727 B2
(45) Date of Patent: Dec. 30, 2008

(54) POLYPROPYLENE RESIN COMPOSITION

(75) Inventor: Toshiyuki Iwashita, Oity (JP)

(73) Assignee: Basell Poliolefine Italia S.p.A., Milan (IT)

(*) Notice: Subject to any disclaimer, the term of this patent is extended or adjusted under 35 U.S.C. 154(b) by 0 days.

(21) Appl. No.: 10/478,347

(22) PCT Filed: May 21, 2002

(86) PCT No.: PCT/EP02/05560

§ 371 (c)(1),
(2), (4) Date: Nov. 21, 2003

(87) PCT Pub. No.: WO02/096986

PCT Pub. Date: Dec. 5, 2002

(65) Prior Publication Data

US 2004/0152818 A1   Aug. 5, 2004

(30) Foreign Application Priority Data

May 30, 2001  (JP) .............................. 2001-163158

(51) Int. Cl.
*C08J 3/28* (2006.01)
*C08L 23/12* (2006.01)
(52) U.S. Cl. .................. 522/112; 522/157; 522/158; 522/159; 522/160; 522/161
(58) Field of Classification Search ................ 524/430, 524/433, 381; 522/112, 111, 157–161; 525/240
See application file for complete search history.

(56) References Cited

U.S. PATENT DOCUMENTS

| | | | |
|---|---|---|---|
| 3,392,156 A | 7/1968 | Donaldson et al. | |
| 3,758,643 A * | 9/1973 | Fischer | 525/51 |
| 4,088,714 A * | 5/1978 | Huff | 525/193 |
| 4,105,718 A | 8/1978 | Weemes et al. | 260/889 |
| 4,220,579 A * | 9/1980 | Rinehart | 524/525 |
| 4,282,076 A * | 8/1981 | Boynton | 522/79 |
| 4,801,651 A | 1/1989 | Komatsu et al. | |
| 4,871,796 A * | 10/1989 | Komatsu et al. | 524/474 |
| 5,030,694 A | 7/1991 | Kelley | |
| 5,047,485 A | 9/1991 | DeNicola, Jr. | 525/387 |
| 5,066,723 A | 11/1991 | Randall | |
| 5,176,872 A * | 1/1993 | Lucas et al. | 264/532 |
| 5,439,949 A * | 8/1995 | Lucas et al. | 522/157 |
| 5,560,886 A | 10/1996 | Saito et al. | |
| 5,596,042 A | 1/1997 | Itoh et al. | |
| 5,639,818 A | 6/1997 | Lee et al. | |
| 5,723,545 A * | 3/1998 | Harrington et al. | 525/194 |
| 6,204,348 B1 | 3/2001 | Raetzsch et al. | 526/351 |
| 6,218,023 B1 * | 4/2001 | DeNicola et al. | 428/515 |
| 6,251,997 B1 * | 6/2001 | Imai et al. | 525/191 |
| 6,300,415 B1 * | 10/2001 | Okayama et al. | 525/191 |
| 6,433,090 B1 * | 8/2002 | Ellul et al. | 525/191 |
| 6,503,985 B1 * | 1/2003 | Ellul et al. | 525/191 |
| 6,569,915 B1 * | 5/2003 | Jackson et al. | 522/112 |
| 6,632,541 B2 * | 10/2003 | Johoji et al. | 428/474.4 |
| 2004/0171712 A1 * | 9/2004 | Ojeda et al. | 522/5 |
| 2004/0171729 A1 * | 9/2004 | Iwashita | 524/430 |

FOREIGN PATENT DOCUMENTS

| | | |
|---|---|---|
| DE | 3401612 | 7/1984 |
| DE | 19720973 | 11/1998 |
| DE | 19724414 | 12/1998 |
| DE | 19905292 | 10/1999 |
| EP | 0063654 | 11/1982 |
| EP | 132931 | 2/1985 |
| EP | 0190889 | 8/1986 |
| EP | 482778 | 4/1992 |
| EP | 672712 | 9/1995 |
| EP | 799839 | 10/1997 |
| EP | 911363 | 4/1999 |
| EP | 911365 | 4/1999 |
| JP | 52138539 | 11/1977 |
| JP | 59093711 | 5/1984 |
| JP | 61152754 | 7/1986 |
| JP | 62121704 | 6/1987 |
| JP | 2298536 | 12/1990 |
| JP | 06256571 | 9/1994 |
| JP | 08003388 | 1/1996 |
| JP | 08183889 | 7/1996 |
| JP | 08230117 | 9/1996 |
| JP | 08311273 | 11/1996 |
| JP | 09012761 | 1/1997 |
| JP | 9012761 | 1/1997 |
| JP | 9104789 | 4/1997 |
| WO | 97/08238 | 3/1997 |
| WO | 99/02604 | 1/1999 |

OTHER PUBLICATIONS

Meligi et al., "Accelerated degradability of polypropylene by blended rubber," *Polymer Degradation and Stability*, vol. 57, p. 241-246, (1997).
Thorat et al., "γ-Ray-Induced Degradation in Ethylene-Propylene Copolymer," *Journal of Applied Polymer Science*, vol. 59, p. 1769-1773 (1996).
Vergnes et al., "Peroxide-controlled Degradation of Poly(propylene): Rheological Behaviour and Process Modelling," *Macromol. Symp.*, vol. 158, p. 77-90 (2000).

(Continued)

*Primary Examiner*—Susan W Berman
(74) *Attorney, Agent, or Firm*—Jarrod N. Raphael

(57) ABSTRACT

A polypropylene resin composition comprising (A) 99.8 to 80 weight parts of a polypropylene resin having a melt flow rate of 0.1 to 50 g/10 min and (B) 0.2 to 20 weight parts of an olefin copolymer rubber having an intrinsic viscosity [η] of 0.5 to 4.0 dl/g and/or a polyethylene resin having a density of 0.895 to 0.945 g/cc and a melt flow rate of 0.05 to 15 g/10 min, which have undergone an ionization ray-irradiation treatment and/or a treatment of adding 0.05 to 5 weight parts of an organic peroxide to 100 weight parts of the aforesaid polypropylene resin composition comprising (A) and (B) and then melting.

26 Claims, 1 Drawing Sheet

OTHER PUBLICATIONS

Braun et al., "Peroxy-Initiated Chain Degradation, Crosslinking, and Grafting in PP-PE Blends," *Journal of Applied Polymer Science*, vol. 68, pp. 2019-2028 (1998).

Van der Wal et al., "Polypropylene-rubber blends: 1. The effect of the matrix properties on the impact behaviour," *Polymer*, vol. 39, No. 26, pp. 6781-6787 (1998).

Hammerschmid et al. "Controlled rheology polypropylene," *Polypropylene*, pp. 95-103 (1999).

Calculation of Matrix-MFR (=Polymer A) no date.

Bernreitner et al., "Correlation between Molecular Structure and Rheological Behaviour of Polypropylene", *Polymer Testing*, vol. 11, pp. 89-100 (1992).

Bremner et al., "Melt Flow Index Values and Molecular Weight Distributions of Commercial Thermoplastics", *Journal of Applied Polymer Science*, vol. 41, pp. 1617-1627 (1990).

Yoo, "MWD Determination of Ultra High MFR Polypropylene by Melt Rheology", *Advances in Polymer Technology*, vol. 13, No. 3, pp. 201-205 (1994).

Romanini et al., "Relation between extrudate swelling of polypropylene and molecular weight", *Rheologica Acta*, vol. 21, pp. 699-704 (1982).

Bremmer et al., Further Comments on the Relations between Melt Flow Index Values and Molecular Weight Distributions of Commercial Plastics, *Journal of Applied Polymer Science*, vol. 43, p. 1773 (1991).

Bafna, "Rheological Measurements: Some Basic Yet Vital Considerations", *Journal of Applied Polymer Science*, vol. 58, pp. 1385-1392 (1995).

Mavridis et al., "Appraisal of a Molecular Weight Distribution-to-Rheology Conversion Scheme for Linear Polyethylenes", *Journal of Applied Polymer Science*, pp. 299-318 (1993).

Attalla et al., "Influence of molecular structure on the extensional behaviour of polyethylene melts", *Rheologica Acta*, vol. 22, pp. 471-475 (1983).

Grein et al., "Melt viscosity effects in ethylene-propylene copolymers", *Rheologica Acta*, (2007).

Baijal et al., "Melt Flow Rate-Intrinsic Viscosity Correlation for Polypropylene", *Journal of Applied Polymer Science*, vol. 14, pp. 1651-1653 (1970).

Furumiya et al., "Relationship between molecular characteristics and physical properties of linear low density polyethylenes", *Pure & Appl. Chem.*, vol. 57, No. 6, pp. 823-832 (1985).

ASTM D1238, *Annual Book of ASTM Standards*, Section 8, Plastics, vol. 08.01, p. 559 (1987).

"Polypropylene Handbook", Hanser Publishers, Munich, p. 252 (1996).

\* cited by examiner

POLYPROPYLENE RESIN COMPOSITION

This application is the U.S. national phase of International Application PCT/EP02/05560, filed May 21, 2002.

FIELD OF THE INVENTION

The present invention relates to a polypropylene resin composition excellent in high melt tension, stiffness, and moldability. Particularly, the invention relates to a polypropylene resin composition high in the melt tension, good in stiffness, small in lowering of melt tension after re-melting, and particularly excellent in recycling properties.

BACKGROUND OF THE INVENTION

Polypropylene resins are inexpensive in general and are widely used as industrial materials for automobile parts and electrical and electronic parts and a variety of packaging materials utilizing properties such as lightweight, chemical resistance, acid resistance, thermal resistance, and so forth.

In the field of packaging materials, the polypropylene packaging materials in particular require high functionality in order to cope with environmental problems, and improvement in characteristics of the polypropylene packaging materials is strongly demanded also from the viewpoint of cost competition.

However, the polypropylene resins have a disadvantage of being inferior in moldability such as extrusion molding, foam molding, blow molding, and so forth. For example, a method of allowing an organic peroxide to react with a crosslinking additive in a resin of a melted state (Japanese Patent Laid-Open No. 93711/1984, Japanese Patent Laid-Open No. 152754/1986, and so forth), a method of allowing a peroxide having a low decomposition temperature and added beforehand to react in an inactive atmosphere (Japanese Patent Laid-Open No. 298536/1990, and a method of heat treating by irradiating a resin with electron rays in an decomposition atomosphere (Japanese Patent Laid-Open No. 121704/1987), and so forth have been proposed as methods for solving this problem.

These conventional methods each improve part of characteristics of the polypropylene resins, but are insufficient in melt tension, leave still a defect of lowering the melt tension when the resins are re-melted for recycling. In addition, the method of using an organic peroxide has the disadvantages of causing odors because of use of a crosslinking additive, terribly lowering the melt tension after being re-melted, and causing coloring with formulations of additives.

The inventors disclose resins having high melt tension and good recycling properties by use of polypropylene resins having high stereoregularity and a low MFR and irradiated with ionization rays in Japanese Patent Laid-Open No. 12761/1997 and Japanese Patent Laid-Open No. 104789/1997. These resins having undergone the ray treatment may be stored or transported for further processes for a certain time and often exposed to a high temperature of 40° C. or above. For example, the resins irradiated in an atmosphere of air show phenomena of rise in the MFR and decrease in the melt tension when allowed to stand at a temperature of 40° C. or above for a long time. In order to solve these problems, a method of storing at 40° C. or below after irradiating with ionization rays, a method of storing in an atmosphere of nitrogen, or a method of heat treating in an atmosphere of nitrogen or under vacuum after irradiation makes the improvement possible, but each has problems in costs and quality control. However, it was found that by use of the compositions of the invention after an ionization-ray irradiation treatment or a peroxide treatment, the change of the MFR is small, and the lowering of the melt tension also is hardly observed even after allowing to stand in an atmosphere of air at 50° C. or above for a long time.

Thus, the invention aims at solving the problems of related art as described above and providing a polypropylene resin composition high in the melt tension, causing no coloring, and small in lowering of the melt tension when recycled.

SUMMARY OF THE INVENTION

The present inventors have intensively studied to solve the problems as described above and as a result, found that a small amount of an olefin copolymer rubber having an intrinsic viscosity [η] of 0.5 to 4.0 dl/g and/or a polyethylene resin having a density of 0.895 to 0.945 g/cc is blended with a polypropylene resin and in addition, an ionization ray-irradiation and/or an organic peroxide treatments are carried out, thereby to obtain high melt tension, cause no coloring, and inhibit an increase of the melt flow rate by the ionization ray-irradiation or the organic peroxide treatment and be small in lowering of the melt tension after re-melted; at least one metal compound selected from particular metal oxides and metal alkoxides is blended with the treated product thus having undergone the ionization ray-irradiation or organic peroxide treatment, thereby to obtain a resin composition further small in lowering of the melt tension when recycled; and further blending with a nucleating agent gives a further excellent advantage, the invention having been accomplished based on these findings.

That is, the invention provides the following polypropylene resin compositions (1) to (5).

(1) A polypropylene resin composition comprising (A) 99.8 to 80 weight parts of a polypropylene resin having a melt flow rate of 0.1 to 50 g/10 min and (B) 0.2 to 20 weight parts of an olefin copolymer rubber having an intrinsic viscosity [η] of 0.5 to 4.0 dl/g and/or a polyethylene resin having a density of 0.895 to 0.945 g/cc and a melt flow rate of 0.05 to 15 g/10 min, which have undergone an ionization ray-irradiation treatment and/or a treatment of adding 0.05 to 5 weight parts of an organic peroxide and then melting to 100 weight parts of the aforesaid polypropylene resin composition comprising (A) and (B).

(2) A polypropylene resin composition wherein 0.01 to 2 weight parts of (C) either an oxide of a metal of the group 2 or the group 12 of the periodic table or a metal alkoxide represented by the following general formula (I) is further added to 100 weight parts of the polypropylene resin composition as described in the aforesaid (1):

$$M(R)_{m-n}(OR')_n \quad \text{(I)}$$

(In the above formula R and R' each represent an alkyl group having a carbon number of 1 to 20, m is 3 or 4, n is an integer satisfying $m \geq n \geq 2$, and M represents B, Al, Si, or a metal atom of the group 4 or the group 5 of the periodic table.)

(3) The polypropylene resin composition as described in the aforesaid (1) or (2) wherein the ionization rays are γ rays and an irradiation dose is from 1 to 80 kGy.

(4) A polypropylene resin composition comprising 5 to 95 weight parts of the polypropylene resin composition as described in any one of the above (1) to (3) and (D) 95 to 5 weight parts of a polypropylene resin having a melt flow rate of 0.01 to 100 g/10 min.

(5) A polypropylene resin composition wherein 0.05 to 20 weight parts of (E) a nucleating agent are further added to 100 weight parts of the polypropylene resin composition as described in any one of the aforesaid (1) to (4).

DETAILED DESCRIPTION OF THE INVENTION

Figure 1:
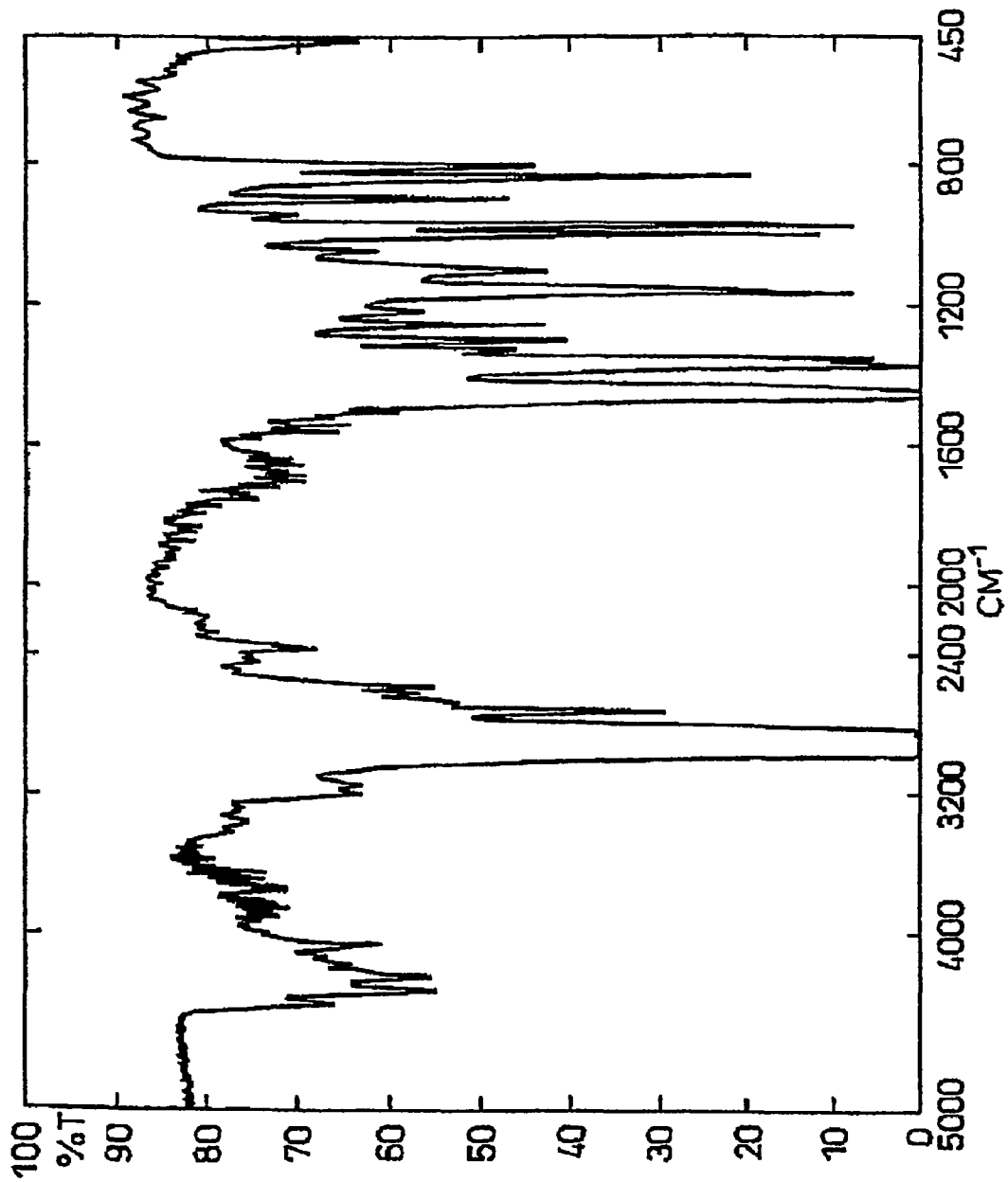
FIG. 1 illustrates a spectrum where the polypropylene resin composition obtained in Example 6 is measured with an infrared spectrophotometer.

Hereinafter, a preferred mode for carrying out the invention is illustrated in detail.

The polypropylene resins used as component (A) in the invention are homopolymers of propylene or copolymers of propylene and other α-olefins having a melt flow rate of 0.1 to 50 g/10 min. Herein, as the other α-olefins there exist ethylene, 1-butene, 1-pentene, 1-hexene, 1-heptene, 1-octene, 1-decene, 4-methyl-1-pentene, and the like. It is preferable that the polymerization amount of the other α-olefins in the copolymers of propylene and the other olefins is at most 10 weight percent. These resins can be used singly or in admixture of two or more. The polymerization of these resins can be carried out, for example, by use of a Ziegler-Natta catalyst according to a known process.

When the amount of the other α-olefins in the copolymers of propylene and the other α-olefins is more than 10 weight percent, it is unpreferable that when the ionization ray treatment or the organic peroxide treatment is carried out, roughness can be observed in the form of strands and furthermore the stiffness can be decreased depending upon irradiation doses and the kinds of organic peroxides.

The melt flow rate of the aforesaid polypropylene resins ranges from 0.1 to 50 g/10 min, usually from 0.2 to 45 g/10 min, further preferably from 0.2 to 40 g/10 min, and particularly preferably from 0.3 to 30 g/10 min. Too small values of this melt flow rate may not become uniform in blending of the propylene resins and the olefin copolymer rubbers or the polyethylene resins, and may cause gelling by the organic peroxide treatment. On the other hand, too large values are unpreferable because improvement in the melt tension is small and sufficient improvement cannot be expected by carrying out the ionization ray treatment or the organic peroxide treatment.

Herein, the melt flow rate (hereinafter occasionally referred to as "MFR") of the polypropylene resins of component (A) are measured according to JIS K7210 at 230° C. under a load of 2.16 kg.

The olefin copolymer rubbers of component (B) used in the invention are amorphous or low crystallinity. That is, it is preferable that when measured with DSC, the melting point cannot be observed or is 135° C. or below even when observed.

Examples thereof include ethylene-propylene copolymer rubber, propylene-butene copolymer rubber, ethylene-butene copolymer rubber, ethylene-propylene-nonconjugated diene copolymer rubber, styrene-ethylene/isoprene-styrene block copolymer rubber (SEPS), styrene-ethylene/butylene-styrene block copolymer rubber (SEBS), and the like. Of these, the ethylene-propylene copolymer rubber and the ethylene-butene copolymer rubber are preferred. The intrinsic viscosity [η] of these measured in tetralin of 135° C. are from 0.5 to 4.0 dl/g, preferably from 0.8 to 3.8 dl/g, particularly preferably from 1.0 to 3.5 dl/g. When the intrinsic viscosities are less than 0.5 dl/g, recycling properties are deteriorated even when the rubber is blended with the polypropylene resin and subjected to the ionization ray-irradiation treatment or the organic peroxide treatment. On the other hand, the intrinsic viscosities more than 4.0 dl/g are unpreferable because the gelling may occur when the compositions are treated with the aforesaid processes.

The content of the olefin copolymer rubbers is from 0.2 to 20 weight parts, preferably from 0.5 to 15 weight parts, and particularly preferably from 1 to 15 weight parts. In a content less than 0.2 weight part, improvement in the recycling properties can not be expected. On the other hand, exceeding 20 weight parts unpreferably causes deterioration in the stiffness. These can be used singly or in admixture of two or more.

The polyethylene resins used as component (B) are from 0.895 to 0.945 g/cc in the density, and from 0.05 to 15 g/10 min in the melt flow rate. The density can be less than 0.895 g/cc, but at present the preparation of such resins is difficult and not practical. On the other hand, exceeding 0.945 g/cc allows the effect to emerge, but the copolymerization ratio increases to invite a high cost of production. These can be used singly or in admixture of two or more.

Herein, the melt flow rate (hereinafter occasionally referred to as "MFR") of the polyethylene resins of component (B) are values measured according to JIS K7210 at 190° C. under a load of 2.16 kg.

As the polyethylene resins there exist ethylene homopolymers or copolymers of ethylene and other monomers. Concretely, the resins may be selected from 1) high-pressure ethylene homopolymers, 2) high-pressure ethylene copolymers, and 3) medium and low-pressure ethylene copolymers.

The polyethylene resins 1) are ethylene homopolymers prepared by a high-pressure process, and the density of them are preferably from 0.902 to 0.939 g/cc.

As the polyethylene resins 2) there exist ethylene copolymers with one or two or more of compounds which are able to be polymerized with ethylene (hereinafter occasionally referred to as "the second comonomers"). Herein, the compounds which are polymerizable with ethylene include vinyl acetate, acrylic acid, methacrylic acid, methyl acrylate, ethyl acrylate, propyl acrylate, butyl acrylate, hexyl acrylate, octyl acrylate, lauryl acrylate, benzyl acrylate, N-dimethylaminoethyl acrylate, methyl methacrylate, ethyl methacrylate, propyl methacrylate, butyl methacrylate, hexyl methacrylate, octyl methacrylate, lauryl methacrylate, fumaric acid, maleic anhydride, maleic acid, fumaric anhydride, dimethyl fumarate, diethyl fumarate, dipropyl fumarate, dibutyl fumarate, dibutyl maleate, methyl vinyl ether, ethyl vinyl ether, 2-hydroxyethyl (meth)acrylate, 2-hydroxybutyl (meth)acrylate, and the like.

These second comonomers can be used singly or in admixture of two or more. The copolymerization ratio of these second comonomers is preferably at most 20 weight percent or less. Although exceeding 20 weight percent also allows desired performance to emerge, performance greater than this is not necessary and exceeding 20 weight percent is not desirable from the viewpoint of costs. The densities of the polyethylene resins 2) are preferably from 0.910 to 0.945 g/cc.

The aforesaid polyethylene resins 1) and the polyethylene resins 2) can be prepared by polymerizing ethylene or ethylene and the second comonomers at 70 to 300 Mpa and preferably at 100 to 250 Mpa under a condition of 100 to 300° C. and preferably 150 to 270° C. (average temperatures inside a reactor) in the presence of a radical initiator. In the preparation, general productive facilities and techniques for low-density polyethylene can be fundamentally utilized. An autoclave with a stirrer or a tubular type reactor can be used as a type of reactors. A plurality of reactors can be connected together in series or in parallel as needed to carry out multistage polymerization. Furthermore, in the case of the autoclave-type reactor, the interior of the reactor is partitioned into a plurality of zones, and thereby a temperature distribution can be provided or stricter temperature controls can be carried out.

In the polymerization, ethylene or ethylene and the second comonomers are compressed and fed into a reactor to carry out polymerization by use of a radical initiator injected otherwise.

The densities of these polyethylene resins are preferably from 0.910 to 0.945 g/cc, further preferably from 0.911 to 0.942 g/cc, and particularly preferably from 0.911 to 0.940 g/cc.

The polyethylene resins 3) include copolymers of ethylene and other α-olefins prepared by medium and low-pressure processes. The other α-olefins include propylene, butene-1, 4-methylpentene-1, hexene-1, heptene-1, octene-1, and the like. These can be used in admixture of two or more. The amount of the other olefins in the copolymers is preferably 10 weight percent or less.

The polyethylene resins 3) can be prepared according to known polymerization processes such as solution polymerization process, slurry polymerization process, gas-phase polymerization process, and so forth by use of known Ziegler catalysts or metallocene catalysts. The densities are preferably from 0.895 to 0.945 g/cc.

The content of the aforesaid polyethylene resins 1) to 3) to 100 weight parts of the polypropylene resins is from 0.2 to 20 weight parts, preferably from 0.5 to 15 weight parts, and particularly preferably from 1 to 15 weight parts. A content less than 0.2 weight part allows no expectation of improvement in the recycling properties. On the other hand, exceeding 20 weight parts unpreferably causes deterioration in stiffness.

The melt flow rate of the polyethylene resins range from 0.05 to 15 g/10 min, generally from 0.06 to 13 g/10 min, particularly from 0.07 to 10 g/10 min, particularly preferably from 0.08 to 8 g/10 min. Too small values of the melt flow rate cause gelling partially when the ionization ray irradiation or the organic peroxide treatment is carried out. On the other hand, too large values do not give high melt tension, but result in lowering the effect of improving the recycling properties.

For the ionization ray-irradiation treatment, there are a method where a propylene resin of component (A) and an olefin copolymer rubber and/or a polyethylene resin of component (B) undergo the irradiation treatment together after melting and kneading together and a method where component (A) and component (B) undergo the irradiation treatment separately before melting and kneading. In the latter case, the irradiation dose may be different by the components, respectively. Forms of the resins undergoing the irradiation can take the forms of pellets, powder, or pulverized products. The irradiation can be carried out under vacuum, in an inert gas, or in an atmosphere of air.

For the organic peroxide treatment, a propylene resin of component (A) and an olefin copolymer rubber and/or a polyethylene resin of component (B) are blended with an organic peroxide and thereafter treated at the step of melting and kneading or component (A) and component (B) are melted and kneaded and thereafter an organic peroxide can be blended and treated. Or component (A) and component (B) can be separately treated with an organic peroxide, and in this case the amounts of the organic peroxide may be different with components.

The irradiation with ionization rays can be carried out in an atmosphere of nitrogen or in an atmosphere of an inert gas or air, but from the viewpoint of costs and working properties, it is desirable to carry out in an atmosphere of air. The ionization rays include X-rays, electron beams, γ rays, α rays, and so forth. The γ rays are preferred from the viewpoint of penetrating power. Irradiation doses in general are preferably from 1 to 80 kGy, further preferably from 2 to 70 kGy, and particularly suitably from 5 to 50 kGy. The irradiation dose less than 1 kGy makes it impossible to expect an effect of improving the melt tension. Exceeding 80 kGy causes gelling to occur depending upon compositions, and results in deteriorating moldability when the composition is re-melted. For example, when the polypropylene resin compositions are molded in the form of strands, fine strands cannot often be obtained.

Diacyl peroxides, peroxyesters, and peroxydicarbonates are preferred as the organic peroxides used in the invention. Examples thereof include lauroyl peroxide, isobutyl peroxide, 3,5,5-trimethylhexanol peroxide, octanol peroxide, stearoyl peroxide, succinperoxide, t-butylperoxy2-ethylhexanol, t-butyl peroxyisobutyrate, t-hexylperoxy2-ethylhexanol, t-hexyl peroxypivalate, t-butylperoxy isopropyl monocarbonate, t-butylperoxy2-ethylhexyl monocarbonate, di-n-propyl peroxydicarbonate, diisopropyl peroxydicarbonate, bis(4-t-butylcyclohexyl) peroxycarbonate, di-2-ethylhexyl peroxydicarbonate, dicetyl peroxydicarbonate, dimyristyl peroxydicarbonate, dibutyl peroxydicarbonate, and the like. Of these, dimyristyl peroxydicarbonate, bis(4-t-butyl-cyclohexyl) peroxydicarbonate, and dicetyl peroxydicarbonate are preferred. These organic peroxides can be used singly or in admixture of two or more.

The content of the organic peroxides to 100 weight parts in the sum of the aforesaid component (A) and component (B) is from 0.05 to 5 weight parts, preferably from 0.1 to 3 weight parts, and particularly preferably from 0.2 to 3 weight parts. A content less than 0.05 weight part allows no expectation of improvement in the melt tension. Exceeding 5 weight parts is unpreferred because it may cause gelling depending upon the kinds of peroxides and simultaneously develop the cause of odor, and unpreferred also from the viewpoint of costs.

In the invention the presence of carbonyl groups or carboxyl groups (there exist peaks at $1780 \text{ cm}^{-1}$ to $1500 \text{ cm}^{-1}$ in absorption spectra measured with a infrared spectrophotometer) in component (A) and component (B) having undergone the ionization ray-irradiation treatment or the organic peroxide treatment or the compositions thereof is more effective when the following component (C) is blended.

The oxides of the group 2 or the group 12 metal of the periodic table (C) used in the invention include zinc oxide, cadmium oxide, magnesium oxide, calcium oxide, barium oxide, and the like.

Examples of metal alkoxides represented by general formula (I) include aluminum isopropoxide, diethylaluminum diethoxide, titanium(IV) tetrabutoxide, titanium(III) triethoxide, diethyltitanium(IV) diisopropoxide, boron tripropoxide, thexylboran dimethoxide, vanadium (IV) tetrabutoxide, zirconium(IV) tetraethoxide, and the like.

The aforesaid metal alkoxides can be those having polymeric structures such as a dimer, a trimer, or the like bonded by forming three-center two-electron bonds.

For the metal oxides or metal alkoxides, commercially available products can be used as such, but preferably have purities of 95 percent or above in this case. The content of the metal oxides or metal alkoxides to 100 weight parts of the polypropylene resin composition comprising component (A) and component (B) having undergone the ionization ray-irradiation treatment or the organic peroxide treatment is preferably from 0.01 to 2 weight parts, further preferably from 0.02 to 1.8 weight parts, and particularly preferably from 0.03 to 1.5 weight parts. A content less than 0.01 weight part is unpreferable because improvement of the melt tension may not be sufficient after being re-melted, and exceeding two weight parts is unpreferably because it may cause coloring or odor.

The polypropylene resins used as component (D) in the invention are homopolymers of propylene or copolymers of propylene with 10 weight percent or less of other α-olefins, for example, ethylene, 1-butene, 1-pentene, 1-hexene, 1-heptene, 1-octene, 1-decene, 4-methyl-1-pentene, or the like. When the amount of the other α-olefins in the copolymers of propylene with other α-olefins exceeds 10 weight percent, a decrease in stiffness may be seen although it depends upon ratios in the compositions.

These polymers can be prepared according to known processes by use of Ziegler-Natta catalysts similarly to the polypropylene resins of component (A) as described above. These resins can be used singly or in admixture of two or more. The melt flow rate of the polypropylene resins of component (D) are preferably from 0.01 to 100 g/10 min, further preferably from 0.05 to 80 g/10 min, and particularly preferably from 0.1 to 70 g/10 min. The melt flow rate (hereinafter occasionally referred to as "MFR") of the polypropylene resins of component (D) are values measured according to JIS K7210 at 230° C. under a load of 2.16 kg.

This component (D) is mixed with the polypropylene resin compositions of the aforesaid (1) and (2) of the invention (hereinafter occasionally referred to as "treated products" when these themselves are not used as final products but as intermediate products) and thereby used for purposes of decreasing a small amount of the aforesaid treated products to design the saving of costs. Component (D) itself is not subjected to the ionization ray-irradiation treatment or the organic peroxide treatment.

Accordingly, the content of component (D) is set up principally in consideration of costs. It is desirable that the polypropylene resins of component (D) range from 95 to 5 weight parts to 5 to 95 weight parts of the aforesaid treated products and particularly the polypropylene resins of component (D) range from 90 to 30 weight parts to 10 to 70 weight parts of the treated products. The polypropylene resins of component (D) can be less than 5 weight parts, but in this case the effect of decreasing costs is small with almost no merits. When component (D) exceeds 95 weight parts, polypropylene resins having high melt tension may not be obtained.

Furthermore, nucleating agents (E) can be added to the resin compositions, agents having an effect of allowing crystals to grow by forming nuclei for crystals when added to crystalline resins such as polypropylene in the field of synthetic resins. Such nucleating agents include, for example, metal salts of carboxylic acids, dibenzylsorbitol derivatives, alkali metal salts of phosphates, inorganic compounds such as talc, and so forth. Concrete examples thereof include sodium benzoate, aluminum adipate, aluminum p-t-butylbenzoate, 1,3,2,4-dibenzylidenesorbitol, 1,3,2,4-bis(p-methyl-benzylidene)sorbitol, 1,3,2,4-bis(p-ethylbenzylidene)-sorbitol, 1,3-p-chlorobenzylidene-2,4-p-methylbenzylidene-sorbitol, sodium bis(4-t-butylphenyl) phosphate, sodium bis(4-t-methylphenyl) phosphate, potassium bis(4,6-di-t-butylphenyl) phosphate, sodium 2,2'-methylene-bis(4,6-di-t-butylphenyl) phosphate, sodium 2,2'-ethylidene-bis(4,6-di-t-butylphenyl) phosphate, and talc, calcium carbonate, and so forth.

The content of the nucleating agents in general is preferably from 0.05 to 20 weight parts to 100 weight parts of the polypropylene resin compositions. There exist preferred ratios depending upon the kinds. For example, in the case of organic compounds except inorganic compounds, the content is generally from 0.05 to 1 weight part, preferably from 0.08 to 0.8 weight part, and particularly preferably from 0.1 to 0.5 weight part. On the other hand, in the case of the inorganic compounds such as talc, the content in general is from 1 to 18 weight parts and particularly preferably from 5 to 15 weight parts.

When the inorganic compounds are used, those treated with coupling agents of titanate series, silane series, and aluminum series or surface treatments such as aliphatic acids, metal salts of aliphatic acids, or aliphatic esters can be used.

The first embodiment of the invention is polypropylene resin compositions prepared by use of the polypropylene resins of component (A) and the olefin copolymer rubbers and/or the polyethylene resins of component (B) by treating these with irradiation with ionization rays or organic peroxides.

According to this embodiment, when the polypropylene resins of component (A), polyethylene resins of component (B), or the compositions thereof are subjected to the ionization ray-irradiation treatment or the organic peroxide treatment (the compositions can be prepared after treating separately), the melt tension of the resulting resin compositions can be improved. Simultaneously the melt tension increases and the lowering of melt tension after being re-melted and kneaded can become small as compared with the case where only the polypropylene resins of component (A) have undergone the ionization ray-irradiation treatment or the organic peroxide treatment.

In the second embodiment of the invention, the metal oxides or metal alkoxides of component (C) are added to the aforesaid embodiment to prepare compositions, and thereby lowering of the melt tension when re-melted and kneaded and rise in the MFR are decreased, and the melt tension can be effectively maintained.

The third embodiment of the invention are resin compositions wherein the polypropylene resin compositions of the aforesaid first embodiment and the second embodiment and the polypropylene resins of component (D) are mixed in the aforesaid range. According to this embodiment, an effect of action similar to the first embodiment and the second embodiment is obtained, and simultaneously a treatment amount of the ionization ray-irradiation or a treatment amount of the organic peroxide can be decreased to realize decrease in costs and improvement in production efficiency.

In the fourth embodiment of the invention, the nucleating agents of component (E) are mixed in the aforesaid range with the polypropylene resin compositions of the aforesaid first embodiment, the aforesaid second embodiment, and the aforesaid third embodiment, and thereby stiffness can be improved in the condition where lowering of the melt tension is decreased. In this case, it is desirable that the polypropylene resins of component (D) and the nucleating agents of component (E) are simultaneously added to and mixed with the resin compositions of the first to third embodiments.

In order to prepare the aforesaid first to fourth polypropylene resin compositions, first, it is preferred that a mixture of component (A) and component (B) is subjected to the ionization ray-irradiation treatment, or an organic peroxide is blended with the mixture of component (A) and component (B) to be melted and kneaded. Herein, processes for obtaining the mixture of component (A) and component (B) include a process of preparing the respective components and then melting and kneading or a process of preparing by polymerizing component (A) and component (B) in one polymerizing system by a method of preliminary polymerization or multi-stage polymerization. For example, a process of preparing component (B) by preliminary polymerization and preparing component (A) by principal polymerization or a process of preparing component (A) at the first stage and preparing component (B) at the second stage are included.

Additions of the respective components of component (C) component (D), and component (E) can be carried out, for example, by mixing the respective components with the treated products where component (A) and component (B) are irradiated with ionization rays or with the polypropylene resin compositions having undergone the organic peroxide treatment, blending with a Henschel mixer and the like, and then carrying out melting and kneading or by feeding the respective components from the side feeders of an extruder. In the invention one component or two or more of plural components of component (C) to component (E) can be blended. When two or more of plural components are blended, these can be added at the same time or added successively. When these are successively added, the order to add these is not particularly limited.

Component (A) undergoes the ionization ray-irradiation treatment or the organic peroxide treatment, subsequently component (B) undergoes the ionization ray-irradiation treatment or the organic peroxide treatment, and subsequently a resin mixture can be made of the component (A) and the component (B). In this case, both are simply blended.

A variety of conventional additives such as antioxidants, weathering stabilizers, antistatic additives, lubricants, anti-fog additives, modifiers of electrical characteristics, processing stabilizers, pigments, flexibilizers, and so forth can be further added to the resin compositions of the invention as needed as long as the aim of the invention is not deteriorated. In this case, the formulation of the additives is not particularly limited, but as a preferred formulation of additives, there exists a combination of a phenolic antioxidant, a phosphite-series additive, and calcium stearate.

Tetrakis[methylene-3-(3',5'-di-t-4-hydroxyphenyl) propionate]methane or n-octadecynyl-3-(4'-hydroxynyl)-propionate is particularly preferred as the phenolic antioxidant.

The content of the phenolic antioxidant to 100 weight parts of the resin compositions ranges from 0.001 to 2 weight parts, particularly preferably from 0.002 to 1.8 weight parts, and more particularly preferably from 0.005 to 1.5 weight parts. A content of the phenolic antioxidant greater than 2 weight parts may increase rise in the MFR and decrease the melt tension stemming from the ionization ray-irradiation treatment or the organic peroxide treatment. A content less than 0.001 weight part may develop deterioration and worsen moldability in some cases depending upon the irradiation dose in the ionization ray treatment and the amount in the organic peroxide treatment.

Tris(2,4-di-t-butylphenyl) phosphite is preferred as the phosphite additive. The content thereof to 100 weight parts of the resin compositions ranges from 0.001 to 1.5 weight parts, particularly preferably from 0.005 to 1.5 weight parts, and more particularly preferably from 0.01 to 1.0 weight part. A content less than 0.001 weight part does not particularly have problem, but there is the possibility that in some cases deterioration may occur on molding of the polyolefin resin compositions. Exceeding 1.5 weight parts may cause a rise in the MFR in the ionization ray-irradiation treatment or the organic peroxide treatment.

The content of calcium stearate to 100 weight parts of the resin compositions ranges from 0.01 to 2 weight parts, particularly preferably from 0.02 to 1.5 weight parts, and more particularly preferably from 0.03 to 1.5 weight parts. A content of calcium stearate greater than 2 weight parts may cause rise in the MFR and a decrease in the melt tension depending upon the ionization ray-irradiation treatment. A content less than 0.01 weight part may cause deterioration when the ionization ray-irradiation treatment or the organic peroxide treatment is carried out.

Methods for mixing the resins to irradiate with ionization rays include methods of melting and mixing by use of kneading machines such as mixing rolls, Banbury mixers, kneaders, extruders, and the like after mixing by use of Henschel mixers, ribbon mixers, and so forth. It is desirable that the temperature of the melting and mixing in general ranges from 150 to 280° C. and from 160 to 260° C.

When the resin compositions are formed into pellets, known procedures can be used. For example, a strand cut method where strands are extruded from an extruder, cooled with water, and then cut at constant length can be preferably used. However, when the irradiation doses of component (A) and component (B) are different, additives and so forth can be blended, and melted and mixed separately. Then this mixed resin pellets or the separated resin pellets undergo the irradiation with ionization rays.

It is desirable that when the organic peroxide treatment is carried out, component (A), component (B), an organic peroxide, additives, and so forth are blended using a Henschel mixer, a ribbon mixer, and the like, and melted and mixed according to the aforesaid method at temperatures ranging generally from 150 to 280° C. and preferably from 160 to 260° C.

A method of forming mixed resins into pellets may be the same as above. When the organic peroxide treatment is carried out, component (A), component (B), an organic peroxide are mixed by use of a reaction vessel, can be treated with stirring in an inert gas at a temperature of 40 to 150° C. for 2 min to 3 hr, and then can be formed into pellets with an extruder.

The melt tension of the polypropylene resin compositions as final products thus obtained is desirably 3 g or more, and particularly desirably 4 g or more. The MFR is preferably from 0.1 to 20 g/10 min and further preferably from 0.15 to 15 g/10 min. When the melt tension of the polypropylene resin compositions is greater than 3 g, good moldability is easily acquired. When the MFR is greater than 0.1 g/10 min, the moldability easily becomes sufficient. In a MFR less than 20 g/10 min, it is preferred that the melt tension does not fall below 3 g, the moldability is good, and particularly no drawdown occurs on vacuum forming.

EXAMPLES

Hereinafter concrete examples are shown to further illustrate the invention.

In the following examples, physical properties each are measured by the following methods.
1. Measurement of the MFR of the polypropylene resins or the polypropylene resin compositions: Measured according to JIS K7210 with Appendix A Table 1 and condition M.
2. Measurement of the MFR of the polyethylene resins: Measured according to JIS K7210, with Appendix A Table 1 and condition D.
3. Density was found by the gradient tube density determination.
4. Content of comonomers: found by nuclear magnetic resonance ($^{13}$C-NMR) and with a infrared spectrophotometer.
5. Intrinsic viscosities [η] were measured in tetralin at 135° C.
6. A carboxyl group or a carbonyl group was checked by nuclear magnetic resonance ($^{13}$C-NMR) or with a infrared spectrophotometer.

7. Melt tension:

By use of a melt tension tester model 2 manufactured by Toyo Seiki Seisakusho K. K., strands extruded into air of 23° C. at a condition of a temperature 230° C. from a nozzle (bore diameter=2.095 mm, L/D=3.8) at a speed of 15 mm/min were taken off, and the melt tension was shown by a load (g) applied when the strands were taken off at a speed of 2.5 m/min.

8. Bending modulus of elasticity (stiffness): Measured according to ASTM D790.

9. Appearance of the polypropylene resin compositions: Strands on pellet forming were inspected with the naked eye and graded according to the following 3 steps.

o: Strands are not rough, but fine.

Δ: Strands are rough.

x: Strands are rough and maintain no original form

10. Decrement factor of the melt tension:

When the polypropylene resin compositions were formed into pellets by use of an extruder of 40 mmφ manufactured by Yoshii Tekko K. K. at a temperature of 210° C., the melt tension was taken as $MT_1$ (one pass). When this product formed into pellet was re-melted (formed into pellets) repeatedly twice, the melt tension was taken as $MT_3$ (three passes), and $[(MT_1-MT_3)/Mt_1]\times100(\%)$ was taken as a decrement factor.

11. Oven tests:

Oven tests were carried out by use of a circulating oven by standing at an atmosphere of air at 50° C. for 720 hr.

The respective materials used in the following examples and comparative examples are as follows:

Polypropylene resins of component (A)

Homopolypropylene having a MFR of 0.58 g/10 min (hereinafter referred to as "PP-A").

Homopolypropylene having a MFR of 6.5 g/10 min (hereinafter referred to as "PP-B").

Polypropylene random copolymer having an ethylene content of 0.6 weight percent and a MFR of 4.2 g/10 min (hereinafter referred to as "PP-C").

Homopolypropylene having a MFR of 0.03 g/10 min (hereinafter referred to as "PP-D").

Homopolypropylene having a MFR of 85 g/10 min (hereinafter referred to as "PP-E").

Olefin copolymer rubbers of component (B)

Ethylene/propylene copolymer rubber having an intrinsic viscosity [η] of 1.9 dl/g and an ethylene content of 73.5 weight percent (hereinafter referred to as "B-1").

Ethylene/propylene copolymer rubber having an intrinsic viscosity [η] of 2.5 dl/g and an ethylene content of 74.2 weight percent (hereinafter referred to as "B-2").

Ethylene/propylene copolymer rubber having an intrinsic viscosity [η] of 2.8 dl/g and an ethylene content of 73.4 weight percent (hereinafter referred to as "B-3").

Ethylene/propylene copolymer rubber having an intrinsic viscosity [η] of 4.3 dl/g and an ethylene content of 74 weight percent (hereinafter referred to as "B-4").

Ethylene/propylene copolymer rubber having an intrinsic viscosity [η] of 0.46 dl/g and an ethylene content of 74.2 weight percent (hereinafter referred to as "B-5").

Ethylene/propylene copolymer rubber having an intrinsic viscosity [η] of 2.4 dl/g and an ethylene content of 70.4 weight percent (hereinafter referred to as "B-6").

Ethylene/propylene copolymer rubber having an intrinsic viscosity [η] of 4.5 dl/g and an ethylene content of 73.3 weight percent (hereinafter referred to as "B-7").

Melting point: Melting points were measured with a DSC model 7 manufactured by the Perkin-Elmer Corporation by raising temperature from 30° C. to 230° C. at 20° C./1 min, holding at 230° C. for min, then lowering at 20° C./1 min, then holding at 30° C. for 5 min, and further raising temperature at 20° C./1 min. The melting points of B-1 to B-7 were not detected.

Polyethylene resins of component (B)

Polyethylene resin having a density of 0.922 g/cc and a MFR of 1.1 g/10 min (hereinafter referred to as "PE-A").

Polyethylene resin having a density of 0.923 g/cc and a MFR of 2.8 g/10 min (hereinafter referred to as "PE-B").

Polyethylene resin having a density of 0.928 g/cc, a copolymerization ratio of methyl methacrylate of 2.8 weight percent, and a MFR of 3.2 g/10 min (hereinafter referred to as "PE-C").

Polyethylene resin having a density of 0.926 g/cc, a copolymerization ratio of butene-1 of 2.7 weight percent, and a MFR of 2.1 g/10 min (hereinafter referred to as "PE-D"). Tetrakis[methylene-3-(3',5'-di-t-hydroxyphenyl)-propionate]methane, tris(2,4-di-t-butylphenyl) phosphite, and calcium stearate were used as additives.

Dimyristyl peroxydicarbonate (hereinafter referred to as "PO-1"), bis(4-t-butylcyclohexyl) peroxydicarbonate (hereinafter referred to as "PO-2"), and dicetyl peroxydicarbonate (hereinafter referred to as "PO-3") were used as organic peroxides.

Magnesium oxide (manufactured by Wako Jun-Yaku Kogyo K. K., Purity 99.8 weight percent, hereinafter referred to as "C-1") and aluminum isopropoxide (manufactured by Wako Jun-Yaku K. k., Purity 98.2 weight percent, hereinafter referred to as "C-2") were used as a metal oxide and a metal alkoxide of component (C), respectively.

Polypropylene resins of component (D)

Homopolypropylene having a MFR of 4.2 g/10 min (hereinafter referred to as "PP-1").

Homopolypropylene having a MFR of 7.8 g/10 min (hereinafter referred to as "PP-2").

Polypropylene random copolymer having an ethylene content of 3.2 weight percent and a MFR of 1.8 g/10 min (hereinafter referred to as "PP-3").

Homopolypropylene having a MFR of 152 g/10 min (hereinafter referred to as "PP-4").

Homopolypropylene having a MFR of 0.007 g/10 min (hereinafter referred to as "PP-5").

Sodium-2,2-methylene-bis(4,6-di-t-butylphenyl)-phosphate (trade name NA11, manufactured by Asahi Denka K. K.) was used as a nucleating agent of component (E).

Examples 1 to 5 and Comparative Examples 1 to 7

First Embodiment of the Invention

The polypropylene resins and the olefin copolymer rubbers as shown in the following Table 1 were used as component (A) and component (B), respectively. To these, 0.05 weight part of tetrakis[methylene-3-(3',5'-di-t-hydroxyphenyl)-propionate]methane, 0.03 weight part of tris(2,4-di-t-butylphenyl) phosphite, and 0.08 weight part of calcium stearate were added, and formed into pellets by use of an extruder of 40 mm+manufactured by Yoshii Tekko K. K. at a temperature of 210° C.

The resulting pellets were irradiated with γ-rays by use of a γ-ray irradiation apparatus (manufactured by Koga Isotope Co.) in irradiation doses as shown in Table 1 in an atmosphere of air to obtain polypropylene resin compositions of the invention. The MFR, the melt tension, and the coloring were checked about these polypropylene resin compositions (The compositions of Examples 1 to 5 having undergone the γ-ray irradiation treatment are referred to as "XPP-1 to 5", and those of Comparative Examples 1 to 7 having undergone the γ-ray irradiation treatment are referred to as "XPP-6 to 12").

Furthermore, the pellets each were re-melted and kneaded by use of a 40 mmφ extruder manufactured by Yoshii Tekko K. K. at a temperature of 210° C., and formed into pellets. The melt tension $MT_1$ (one pass) was measured about the resulting pellets.

Furthermore, the pellets each were melted and kneaded again, and after pellet formation was repeated twice, the melt tension $MT_3$ (three passes) was measured to find decrement factors. The appearance and the recycling properties of strands were checked when the melt tension $MT_3$ (three passes) was measured.

Results of these are shown in Table 1.

It is seen from results in Table 1 that the resin compositions of Examples 1 to 5 show high melt tension, the appearance of the strands also is satisfactory, and the decrement factors of the melt tension also are small when the compositions were recycled. The coloring also was not observed.

The compositions of Comparative Example 1, Comparative Example 2, Comparative Example 4, and Comparative Example 7 are bad in the appearance of the strands. The composition of Comparative Example 3 is good in the appearance of the strand, but small in the melt tension. Furthermore, the compositions of Comparative Examples 5 and 6 are large in the decrement factors of the melt tension when recycled.

Examples 6 to 9 Comparative Examples 8 to 11

First Embodiment of the Invention

The polypropylene resins and the olefin copolymer rubbers as shown in the following Table 2 were used as component (A) and component (B), additives were added to these similarly to Example 1, PO-1, PO-2, and PO-3 were added as organic peroxides, and formed into pellets by use of an extruder of 40 mmφ manufactured by Yoshii Tekko K. K. at a temperature of 190° C. to obtain polypropylene resin compositions of the invention.

Subsequently, about the polypropylene resin compositions (XPP-13 to 16) obtained in Examples 6 to 9 and polypropylene resin compositions (XPP-17 to 20) obtained in Comparative Examples 8 to 11, the MFR, the melt tension, and the coloring were checked. Moreover, re-melting and kneading were carried out similarly to Example 1, and the decrement factors of the melt tension and the appearance of the strands (herein, the recycling properties of XPP-17 were omitted) were checked.

Results are shown in Table 2.

TABLE 1

| Example and Comparative Example | Polypropylene Resin | Content (weight part) | Olefin Copolymer Rubber | Content (weight part) | Irradiation Dose of γ-Rays (kGy) | Designation after Irradiation | MFR (g/10 min) | Melt Tension (MT) (g) | Appearance of Strand | Decrement Factor of Melt Tension $(MT_1 - MT_3)/MT_1 \times 100$ (%) | Oven Test 50° C. (720 hr) MFR | MT |
|---|---|---|---|---|---|---|---|---|---|---|---|---|
| Example 1 | PP-A | 97 | B-1 | 3 | 30 | XPP-1 | 4.6 | 10.6 | o | 32 | 4.9 | 10.2 |
| Example 2 | PP-B | 97 | B-3 | 3 | 30 | XPP-2 | 7.6 | 7.8 | o | 27 | 8.0 | 7.4 |
| Example 3 | PP-A | 98 | B-6 | 2 | 25 | XPP-3 | 4.1 | 6.8 | o | 28 | 4.6 | 6.2 |
| Example 4 | PP-C | 97 | B-2 | 3 | 30 | XPP-4 | 6.8 | 8.1 | o | 26 | 7.2 | 7.8 |
| Example 5 | PP-B | 97 | B-2 | 3 | 30 | XPP-5 | 7.2 | 7.6 | o | 31 | 7.6 | 7.2 |
| Comp. Ex. 1 | PP-D | 97 | B-2 | 3 | 30 | XPP-6 | 0.2 | 14 | X | 51 | 0.5 | 12 |
| Comp. Ex. 2 | PP-A | 98 | B-4 | 2 | 30 | XPP-7 | 4.1 | 5.4 | Δ | 42 | 4.6 | 4.9 |
| Comp. Ex. 3 | PP-E | 97 | B-6 | 2 | 30 | XPP-8 | 120 | 0.1 or less | o | — | 132 | — |
| Comp. Ex. 4 | PP-B | 97 | B-7 | 3 | 25 | XPP-9 | 5.2 | 4.2 | X | 47 | 5.6 | 3.9 |
| Comp. Ex. 5 | PP-B | 97 | B-5 | 3 | 30 | XPP-10 | 8.6 | 3.3 | o | 68 | 9.1 | 3.1 |
| Comp. Ex. 6 | PP-A | 99.9 | B-1 | 0.1 | 30 | XPP-11 | 5.2 | 6.2 | o | 64 | 6.8 | 4.2 |
| Comp. Ex. 7 | PP-B | 75 | B-3 | 25 | 30 | XPP-12 | 2.1 | 6.8 | Δ | 36 | 2.5 | 6.2 |

TABLE 2

| Example and Comparative Example | Polypropylene Resin | | Olefin Copolymer Rubber | | Organic Peroxide | | Designation after Treatment | MFR (g/10 min) | Melt Tension (MT) (g) | Appearance of Strand | Decrement Factor of Melt Tension $(MT_1 - MT_3)/MT_1 \times 100$ (%) | Oven Test 50° C. (720 hr) | |
|---|---|---|---|---|---|---|---|---|---|---|---|---|---|
| | | Content (weight part) | | Content (weight part) | | Content (weight part) | | | | | | MFR | MT |
| Example 6 | PP-B | 98 | B-1 | 2 | PO-1 | 1.0 | XPP-13 | 2.1 | 13 | o | 33 | 2.2 | 12 |
| Example 7 | PP-C | 97 | B-2 | 3 | PO-2 | 1.0 | XPP-14 | 2.8 | 12 | o | 29 | 3.1 | 11 |
| Example 8 | PP-A | 97 | B-6 | 3 | PO-3 | 1.0 | XPP-15 | 0.42 | 18 | o | 36 | 0.46 | 18 |
| Example 9 | PP-B | 98 | B-3 | 2 | PO-2 | 0.7 | XPP-16 | 2.1 | 9.8 | o | 27 | 2.3 | 9.6 |
| Comp. Ex. 8 | PP-E | 97 | B-2 | 3 | PO-1 | 1.0 | XPP-17 | 82 | 0.1 or less | o | — | 88 | — |
| Comp. Ex. 9 | PP-B | 97 | B-4 | 3 | PO-2 | 0.7 | XPP-18 | 1.8 | 9.4 | Δ | 48 | 1.9 | 9.3 |
| Comp. Ex. 10 | PP-B | 97 | B-7 | 3 | PO-3 | 1.0 | XPP-19 | 2.2 | 9.8 | X | 46 | 2.4 | 9.5 |
| Comp. Ex. 11 | PP-A | 99.9 | B-2 | 0.1 | PO-2 | 1.0 | XPP-20 | 0.51 | 11 | o | 68 | 1.4 | 9.1 |

It is seen from results of Table 2 that the compositions of Examples 6 to 9 show high melt tension, the appearance of the strands also is satisfactory, and the decrement factors of the melt tension also are small when the compositions are recycled. No coloring also was observed.

On the other hand, the composition of Comparative Example 8 is small in the melt tension, and the compositions of Comparative Examples 9 and 10 are deteriorated in the appearance of the strands. The composition of Comparative Example 11 is large in the decrement factor of the melt tension when re-cycled.

The infrared absorption spectrum of Example 6 is shown in FIG. 1.

Examples 10 to 15

First Embodiment of the Invention

Component (A) and component (B) as shown in Table 3 separately underwent the γ-ray irradiation treatment or the organic peroxide treatment. Herein, 0.03 weight part of tetrakis[methylene-3-(3',5'-di-t-hydroxyphenyl)-propionate]methane, 0.02 weight part of tris(2,4-di-t-butylphenyl) phosphite, and 0.05 weight part of calcium stearate were added to component (A) as additives and treated. Component (B) was treated without adding additives. The respective components having separately undergone the γ-ray irradiation treatment or the organic peroxide treatment were blended in ratios as shown in Table 3, and formed into pellets by use of an extruder of 40 mm+manufactured by Yoshii Tekko K. K. at 210° C. to obtain polypropylene resin compositions of the invention. The MFR, the melt tension, and the coloring were checked. Moreover, re-melting and kneading were carried out similarly to Example 1, and the decrement factors, the appearance of strands, and the recycling properties were checked.

TABLE 3

| Designation of Treated Products | Polypropylene Resin | Olefin Copolymer Rubber | Irradiation Dose of γ-rays (kGy) | Kind of Organic Peroxide | Content (weight part) | MFR (g/10 min) | Intrinsic Viscosity (dl/g) |
|---|---|---|---|---|---|---|---|
| PP-A-1 | PP-A | | 50 | | | 4.8 | |
| PP-C-1 | PP-C | | 40 | | | 5.2 | |
| PP-B-1-1 | PP-B | | | PO-1 | 1.0 | 2.1 | |
| PP-C-1-1 | PP-C | | | PO-3 | 1.0 | 3.2 | |
| B-1-1 | | B-1 | 15 | | | 19 | 2.6 |
| B-3-1 | | B-3 | 15 | | | 0.7 | 3.8 |
| B-2-1-1 | | B-2 | | PO-1 | 0.5 | 0.6 | 4.1 |
| B-1-1-1 | | B-1 | | PO-2 | 0.5 | 22 | 2.4 |

About the resulting resin compositions, results of measurements carried out similarly to Example 1 are shown in the following Table 4. About the γ-ray treated products from the polypropylene resins, the treated product from PP-A is described as PP-A-1, and the treated product from PP-C is described as PP-C-1. About the products treated with the organic peroxides, the treated product from PP-B is described as PP-B-1-l, and the treated product from PP-C is described as PP-C-1-1. About the γ-ray treated products from the olefin copolymer rubbers, the treated product from B-1 is described as B-1-1, the treated product from B-3 is described as B-3-1, and about the organic peroxide treated products, the treated product from B-1 is described as B-1-1-1, and the treated product from B-2 is described as B-2-1-1.

TABLE 4

| Example | Treated Product from Polypropylene Resin | Content (weight part) | Treated Product from Olefin Copolymer Rubber | Content (weight part) | Designation of Composition | MFR (g/10 min) | Melt Tension (MT) (g) | Appearance of Strand | Decrement Factor of Melt Tension $(MT_1 - MT_3)/MT_1 \times 100$ (%) |
|---|---|---|---|---|---|---|---|---|---|
| Example 10 | PP-A-1 | 97 | B-1-1 | 3 | XPP-21 | 5.8 | 14 | o | 31 |
| Example 11 | PP-C-1 | 98 | B-3-1 | 2 | XPP-22 | 6.4 | 11 | o | 28 |
| Example 12 | PP-B-1-1 | 97 | B-1-1 | 3 | XPP-23 | 3.2 | 9.8 | o | 31 |
| Example 13 | PP-C-1-1 | 97 | B-1-1-1 | 2 | XPP-24 | 4.3 | 8.8 | o | 27 |
| Example 14 | PP-A-1 | 97 | B-2-1-1 | 3 | XPP-25 | 5.6 | 13 | o | 33 |
| Example 15 | PP-B-1 | 97 | B-1-1 | 3 | XPP-26 | 3.4 | 9.6 | o | 32 |

All XPP-21 to 26 which are compositions containing polypropylene resins and olefin copolymer rubbers different in the irradiation dose of γ-rays and compositions containing those treated by other modes show high melt tension and good recycling properties, and cause no coloring.

Examples 16 to 19 Comparative Examples 12 to 15

Second Embodiment of the Invention

To the samples of XPP-1 obtained in Example 1, XPP-13 obtained in Example 6, XPP-22 obtained in Example 11, XPP-24 obtained in Example 13, XPP-7 obtained in Comparative Example 2, XPP-11 obtained in Comparative Example 6, XPP-19 obtained in Comparative Example 10, and XPP-20 obtained in Comparative Example 11, C-1 and C-2 were added in ratios as shown in the following Table 5, kneaded by use of an extruder of 40 mmφ manufactured by Yoshii Tekko K. K. at a temperature of 210° C., and formed into pellets to obtain polypropylene resin compositions of the invention.

Subsequently, about the resulting polypropylene compositions, the MFR and the melt tension (This was described as $MT_1$ (one pass).) were measured. Furthermore, the respective pellets were melted and mixed again by use of a melting and kneading machine, and pellet formation was repeated twice, and then the melt tension $MT_3$ (three passes) was measured to find decrement factors. In addition, the appearance of strands was checked when the melt tension $MT_3$ (three passes) was measured.

Results of these are shown in Table 5.

It is seen from results in Table 5 that in the compositions of Examples 16 to 19, the melt tension hardly changes by blending component (C) and melting and kneading as compared with the aforesaid examples. The decrement factors of the melt tension MT after re-melting are smaller than those of the aforesaid examples.

On the other hand, in the compositions of the comparative examples, the melt tension MT after re-melting decreases, and the decrement factors also are larger than the examples.

Examples 20 to 24 Comparative Examples 16 to 19

Third Embodiment of the Invention

To the samples of XPP-1 obtained in Example 1, XPP-3 obtained in Example 3, XPP-16 obtained in Example 9, XPP-21 obtained in Example 10, XPP-23 obtained in Example 12, XPP-28 obtained in Example 17, XPP-6 obtained in Comparative Example 1, XPP-9 obtained in Comparative Example 4, XPP-19 obtained in Comparative Example 10, and XPP-33 obtained in Comparative Example 14, component (D) was added in ratios as shown in the following Table 6, and similarly to Example 16, melted and kneaded, and formed into pellets to obtain polypropylene resin compositions of the invention.

About the resulting pellets, the MFR and the melt tension ($MT_1$ (one pass)) were measured similarly to Example 16. Moreover, similarly to Example 16, melting and kneading were carried out again, and the decrement factors of the melt tension and the appearance were checked.

Results of these are shown in Table 6.

TABLE 5

| Example and Comparative Example | Sample | Component C | Content (weight part) | MFR (g/10 min) | Melt Tension $MT_1$ (g) | Designation of Composition | Appearance of Strand | Decrement Factor of Melt Tension (MT) $(MT_1 - MT_3)/MT_1 \times 100$ (%) |
|---|---|---|---|---|---|---|---|---|
| Example 16 | XPP-1 | C-2 | 0.2 | 5.2 | 9.8 | XPP-27 | o | 17 |
| Example 17 | XPP-13 | C-2 | 0.2 | 2.6 | 11 | XPP-28 | o | 16 |
| Example 18 | XPP-22 | C-1 | 0.3 | 6.8 | 10 | XPP-29 | o | 6 |
| Example 19 | XPP-24 | C-2 | 0.2 | 4.6 | 8.3 | XPP-30 | o | 7 |
| Comp. Ex. 12 | XPP-7 | C-1 | 0.3 | 5.8 | 3.1 | XPP-31 | Δ | 41 |
| Comp. Ex 13 | XPP-11 | C-2 | 0.2 | 7.6 | 4.3 | XPP-32 | o | 59 |
| Comp. Ex. 14 | XPP-19 | C-2 | 0.2 | 4.1 | 5.7 | XPP-33 | X | 45 |
| Comp. Ex. 15 | XPP-20 | C-1 | 0.3 | 1.3 | 6.2 | XPP-34 | o | 58 |

TABLE 6

| Example and Comparative Example | Compositions Designation | Content (weight part) | Component (D) Designation | Content (weight part) | MFR (g/10 min) | Melt Tension (MT$_1$) (g) | Appearance of Strand | Decrement Factor of Melt Tension (MT$_1$ − MT$_3$)/ MT$_1$ × 100 (%) |
|---|---|---|---|---|---|---|---|---|
| Example 20 | XPP-1 | 50 | PP-3 | 50 | 5.2 | 6.8 | o | 17 |
| Example 21 | XPP-3 | 40 | PP-1 | 60 | 4.8 | 5.1 | o | 18 |
| Example 22 | XPP-16 | 30 | PP-2 | 70 | 3.1 | 5.4 | o | 17 |
| Example 23 | XPP-21 | 50 | PP-1 | 50 | 5.2 | 8.2 | o | 19 |
| Example 24 | XPP-28 | 50 | PP-1 | 50 | 2.6 | 8.4 | o | 7 |
| Comp. Ex. 16 | XPP-6 | 40 | PP-1 | 60 | 0.7 | 7.2 | X | 45 |
| Comp. Ex. 17 | XPP-9 | 50 | PP-3 | 50 | 4.2 | 3.8 | X | 41 |
| Comp. Ex. 18 | XPP-19 | 30 | PP-2 | 70 | 4.6 | 3.2 | Δ | 42 |
| Comp. Ex. 19 | XPP-33 | 40 | PP-2 | 60 | 6.2 | 2.9 | X | 39 |

It is seen from Examples 20 to 24 that the melt tension is high in spite of the blending of component (D), and in addition the decrement factors of the melt tension are small. Particularly, the composition of Example 24 having component (C) blended is small in the decrement factor of the melt tension.

On the other hand, the compositions of Comparative Examples 16 to 18 are bad in the appearance of the strands, and large also in the decrement factors of the melt tension. The composition of Comparative Example 19 is small in the melt tension and in addition bad in the appearance of the strand.

Examples 25 and 26

Fourth Embodiment of the Invention

To the samples of XPP-1 of Example 1 and XPP-16 of Example 9, 0.4 weight part of NA11 was added as component (E), formed into pellets similarly to Example 16 to obtain polypropylene resin compositions of the invention. Test pieces were prepared from these pellets, and the flexural moduli were measured. The melt tension and the decrement factors were checked similarly to Example 16.

Results are shown in the following Table 7.

ponent (B), respectively. To these, 0.05 weight part of tetrakis [methylene-3-(3',5'-di-t-hydroxyphenyl)-propionate]methane, 0.03 weight part of tris(2,4-di-t-butyl-phenyl) phosphite, and 0.08 weight part of calcium stearate were added, and formed into pellets by use of a twin screw extruder of 30 mmφ manufactured by Nakatani K. K. at a temperature of 210° C.

The resulting pellets were irradiated with γ-rays by use of a γ-ray irradiation device (manufactured by Koga Isotope K. K.) in irradiation doses as shown in Table 1 in an atmosphere of air to obtain polypropylene resin compositions of the invention. The MFR, the melt tension, and the coloring were checked about the pellets having undergone the γ-ray irradiation treatment (Pellets of Examples 27 to 29 having undergone the γ-ray irradiation treatment are referred to as XPP-35 to 37, and those of Comparative Examples 20 and 21 having undergone the γ-ray irradiation treatment are referred to as XPP-38 and 39).

Furthermore, the respective pellets of the polypropylene resin compositions were re-melted and kneaded by use of a 40 mmφ extruder manufactured by Yoshii Tekko K. K. at a temperature of 210° C., and formed into pellets. About the resulting pellets, the melt tension MT$_1$ (one pass) was measured.

TABLE 7

| Example | Resin Composition | Component (E) (weight part) | MFR (g/10 min) | Flexural Moduli (MPa) | Melt Tension (MT$_1$) (g) | Appearance of Strand | Decrement Factor of Melt Tension (MT$_1$ − MT$_3$)/ MT$_1$ × 100 (%) |
|---|---|---|---|---|---|---|---|
| Example 25 | XPP-1 | 0.4 | 5.2 | 2310 | 8.6 | o | 32 |
| Example 26 | XPP-16 | 0.4 | 3.2 | 2350 | 7.8 | o | 28 |

Both the compositions of Examples 25 and 26 are high in the melt tension, good also in the appearance of the strands, and high also in the flexural moduli.

Examples 27 to 29 Comparative Examples 20 and 21

First Embodiment of the Invention

Polypropylene resins and polyethylene resins as shown in the following Table 1 were used as component (A) and com- Moreover, the respective pellets were melted and kneaded again, the pellet formation was repeated twice, and then the melt tension MT$_3$ (three passes) was measured to find decrement factors. In addition the appearance and recycling properties of the strands were checked when the melt tension MT$_3$ (three passes) was measured.

Results of these are shown in Table 8.

TABLE 8

| Example and Comparative Example | Polypropylene Resin Content (weight part) | | Polyethylene Resin Content (weight part) | | Irradiation Dose of γ-Rays (kGy) | Designation after Irradiation | MFR (g/10 min) | Melt Tension (MT) (g) | Appearance of Strand | Decrement Factor of Melt Tension $(MT_1 - MT_3)/MT_1 \times 100$ (%) | Oven Test 50° C. (720 hr) | |
|---|---|---|---|---|---|---|---|---|---|---|---|---|
| | | | | | | | | | | | MFR | MT |
| Example 27 | PP-A | 98 | PE-B | 2 | 30 | XPP-35 | 4.4 | 11.6 | o | 28 | 4.7 | 11.3 |
| Example 28 | PP-C | 97 | PE-A | 3 | 30 | XPP-36 | 5.8 | 9.8 | o | 27 | 6.2 | 9.4 |
| Example 29 | PP-A | 97 | PE-C | 3 | 30 | XPP-37 | 4.1 | 12.6 | o | 29 | 4.4 | 12.2 |
| Comp. Ex. 20 | PP-D | 97 | PE-A | 3 | 30 | XPP-38 | 0.3 | 16.7 | X | 48 | 0.6 | 16.1 |
| Comp. Ex. 21 | PP-E | 97 | PE-C | 3 | 30 | XPP-39 | 131 | 0.1 or less | o | — | — | — |

It is seen from results in Table 8 that the compositions of Examples 27 to 29 show high melt tension, are good also in the appearance of the strands, and small also in the decrement factors of the melt tension when recycled. No coloring also was observed as well.

On the other hand, the composition of Comparative Example 20 is bad in the appearance of the strand, and large also in the decrement factor of the melt tension. The composition of Comparative Example 21 is good in the appearance of the strand, but small in the melt tension.

Examples 30 to 33 Comparative Example 22

First Embodiment of the Invention

Polypropylene resins and polyethylene resins as shown in the following Table 9 were used as component (A) and component (B), additives were blended with these similarly to Example 27, PO-1, PO-2, and PO-3 were added as the organic peroxides, and formed into pellets by use of a twin screw extruder of 30 mmφ manufactured by Nakatani K. K. at a temperature of 190° C. to obtain polypropylene resin compositions of the invention.

Subsequently, about the compositions of Examples 30 to 32 (XPP-40 to 43) and the composition of Comparative Example 22 (XPP-44), the MFR, the melt tension, and the coloring were checked. Furthermore, re-melting and kneading were carried out similarly to Example 27, and the decrement factors of the melt tension and the appearance of the strands were checked.

Results are shown in Table 9.

It is seen from results in Table 9 that the compositions of Example 30 to 33 are high in the melt tension, good also in the appearance of the strands, and small also in the decrement factors of the melt tension.

On the other hand, the composition of Comparative Example 22 is good in the appearance of the strand, but small in the melt tension.

Examples 34 to 38 Comparative Examples 23 and 24

Second Embodiment of the Invention

To the samples of XPP-35 obtained in Example 27, XPP-36 obtained in Example 28, XPP-41 obtained in Example 31, XPP-42 obtained in Example 32, XPP-37 obtained in Example 29, XPP-38 obtained in Comparative Example 20, and XPP-39 obtained in Comparative Example 21, C-1 and C-2 were added in ratios as shown in the following Table 10, kneaded by use of a 40 mmφ extruder manufactured by Yoshii Tekko K. K. at a temperature of 210° C., and formed into pellets to obtain polypropylene resin compositions of invention.

Subsequently, about the resulting pellets, the MFR and the melt tension (This was described as $MT_1$ (one pass)) were measured. Furthermore, the respective pellets were melted and mixed again by use of a melting and kneading device, after pellet formation was repeated twice, and then the melt tension $MT_3$ (three passes) was measured to find decrement factors. Moreover, the appearance of the strands was checked when the melt tension $MT_3$ (three pass) was measured.

Results of these are shown in Table 10.

TABLE 9

| Example and Comparative Example | Polypropylene Resin Content (weight part) | | Polyethylene Resin Content (weight part) | | Organic Peroxide Content (weight part) | | Designation after Treatment | MFR (g/10 min) | Melt Tension (MT) (g) | Appearance of Strand | Decrement Factor of Melt Tension $(MT_1 - MT_3)/MT_1$ | Oven Test 50° C. (720 hr) | |
|---|---|---|---|---|---|---|---|---|---|---|---|---|---|
| | | | | | | | | | | | | MFR | MT |
| Example 30 | PP-B | 98.5 | PE-A | 1.5 | PO-3 | 1.0 | XPP-40 | 1.9 | 15.3 | o | 32 | 2.0 | 15.1 |
| Example 31 | PP-C | 97 | PE-C | 3 | PO-1 | 1.0 | XPP-41 | 2.1 | 17.1 | o | 29 | 2.3 | 16.8 |
| Example 32 | PP-B | 97 | PE-B | 3 | PO-2 | 1.0 | XPP-42 | 1.8 | 14.9 | o | 31 | 1.9 | 14.7 |
| Example 33 | PP-B | 97 | PE-D | 3 | PO-3 | 1.0 | XPP-43 | 2.2 | 14.7 | o | 33 | 2.3 | 14.5 |
| Comp. Ex. 22 | PP-E | 97 | PE-A | 3 | PO-2 | 0.7 | XPP-44 | 41 | 0.2 | o | — | 43 | 0.2 |

Herein, the compositions of Examples 34 to 38 were described as XPP-45 to 49, and the compositions of Comparative Examples of 23 and 24 were described as XPP-50 and 51.

TABLE 10

| Example and Comparative Example | Sample | Component (C) Content (weight part) | MFR (g/10 min) | Melt Tension ($MT_1$) (g) | Designation of Composition | Appearance of Strand | Decrement Factor of Melt Tension ($MT_1 - MT_3$)/ $MT_1 \times 100$ (%) |
|---|---|---|---|---|---|---|---|
| Example 34 | XPP-35 | C-2  0.3 | 4.6 | 11.3 | XPP-45 | o | 8.3 |
| Example 35 | XPP-36 | C-2  0.3 | 6.0 | 9.6 | XPP-46 | o | 7.9 |
| Example 36 | XPP-41 | C-2  0.2 | 2.4 | 16.6 | XPP-47 | o | 8.7 |
| Example 37 | XPP-42 | C-1  0.3 | 2.2 | 14.4 | XPP-48 | o | 9.2 |
| Example 38 | XPP-37 | C-1  0.3 | 4.6 | 12.0 | XPP-49 | o | 11 |
| Comp. Ex. 23 | XPP-38 | C-2  0.3 | 0.5 | 15.9 | XPP-50 | X | 41 |
| Comp. Ex. 24 | XPP-39 | C-1  0.3 | 152 | 0.1 or less | XPP-51 | o | — |

It is seen from results in Table 10 that in the compositions of Examples 34 to 38, the melt tension is high, and the decrement factors of the melt tension after re-melting also are smaller than those in the aforesaid examples by adding component (C) and melting and kneading. On the other hand, in the composition of Comparative Example 23, the melt tension after one pass is high, but the appearance of the strand is bad, and the decrement factor of the melt tension after re-melting also is large. In Comparative Example 24, the melt tension is small.

Examples 39 to 45 Comparative Examples 25 and 26

Third Embodiment of the Invention

To the samples of XPP-35 obtained in Example 27, XPP-36 obtained in Example 28, XPP-40 obtained in Example 30, XPP-41 obtained in Example 31, XPP-45 obtained in Example 34, XPP-47 obtained in Example 36, XPP-43 obtained in Example 33, XPP-50 obtained in Comparative Example 23, and XPP-44 obtained in Comparative Example 22, component (D) was added in ratios as shown in the following Table 11, melted and kneaded similarly to Example 27, and formed into pellets to obtain polypropylene resin compositions of the invention.

About the resulting pellets, the MFR and the melt tension (This was described as $MT_1$ (one pass)) were measured similarly to Example 30. Moreover, melting and kneading were carried out again similarly to Example 30, and the decrement factors of the melt tension and the appearance were checked.

Results of these are shown in Table 11.

TABLE 11

| Example and Comparative Example | Compositions Designation | Content (weight part) | Component (D) Designation | Content (weight part) | MFR (g/10 min) | Melt Tension ($MT_1$) (g) | Appearance of Strand | Decrement Factor of Melt Tension ($MT_1 - MT_3$)/ $MT_3 \times 100$ (%) |
|---|---|---|---|---|---|---|---|---|
| Example 39 | XPP-35 | 50 | PP-3 | 50 | 3.9 | 6.2 | o | 26 |
| Example 40 | XPP-36 | 50 | PP-3 | 50 | 4.5 | 5.3 | o | 25 |
| Example 41 | XPP-40 | 60 | PP-1 | 40 | 3.6 | 8.2 | o | 29 |
| Example 42 | XPP-41 | 40 | PP-2 | 60 | 5.3 | 7.8 | o | 27 |
| Example 43 | XPP-45 | 60 | PP-1 | 40 | 4.6 | 6.8 | o | 7.2 |
| Example 44 | XPP-47 | 50 | PP-2 | 50 | 5.4 | 7.2 | o | 7.6 |
| Example 45 | XPP-43 | 60 | PP-1 | 40 | 3.4 | 7.8 | o | 28 |
| Comp. Ex. 25 | XPP-38 | 50 | PP-2 | 50 | 3.6 | 5.1 | Δ | 39 |
| Comp. Ex. 26 | XPP-39 | 50 | PP-1 | 50 | 15.2 | 0.4 | x | 50 |

It is seen that according to Examples 39 to 45, the melt tension is high and further the decrement factors of the melt tension are small even by adding component (D). Particularly, the compositions of Examples 43 and 44 blended with component (C) are small in the decrement factors of the melt tension and good also in the appearance of the strands.

On the other hand, the compositions of Comparative Examples 25 and 26 are bad in the appearance of the strands and large also in the decrement factors of the melt tension.

Examples 46 and 47

Forth Embodiment of the Invention

To the samples of XPP-35 of Example 27 and XPP-42 of Example 32, 0.4 weight part of NA11 was added as component (E) and formed into pellets to obtain polypropylene resin compositions of the invention similarly to Example 30. Test species were prepared from these pellets, and the flexural moduli were measured. The melt tension and the decrement factors were checked similarly to Example 30.

Results are shown in the following Table 12.

TABLE 12

| Example | Resin Composition | Component (E) (weight part) | MFR (g/10 min) | Flexural moduli (MPa) | Melt Tension $(MT_1)$ (g) | Appearance of Strand | Decrement Factor of Melt Tension $(MT_1 - MT_3)/MT_1 \times 100$ (%) |
|---|---|---|---|---|---|---|---|
| Example 46 | XPP-35 | 0.4 | 5.1 | 2280 | 10.6 | o | 9.6 |
| Example 47 | XPP-42 | 0.4 | 2.2 | 2180 | 13.1 | o | 32 |

Both the compositions of Examples 46 and 47 are high in the melt tension, good also in the appearance of the strands, high also in the flexural moduli.

According to the invention as illustrated above polypropylene resin compositions high in the melt tension and excellent in moldability, and simultaneously excellent in recycling properties and having no coloring and no odor are obtained. Furthermore, when re-melted, polypropylene resin compositions controlled in rise of the MFR, prevented from lowering of the melt tension, and furthermore excellent in the recycling properties are obtained. Moreover, reduction of costs and improvement in production efficiency can be designed.

The invention claimed is:

1. A polypropylene resin composition comprising (A) 99.8 to 80 weight parts of a polypropylene resin having a melt flow rate of 0.1 to 50 g/10 min measured at 230° C. under a load of 2.16 kg; and (B) 0.2 to 20 weight parts of at least one polyolefin selected from the group consisting of an olefin copolymer rubber having an intrinsic viscosity [η] of 0.5 to 4.0 dl/g, a polyethylene resin having a density of 0.895 to 0.945 g/cc and a melt flow rate of 0.05 to 15 g/10 min measured at 190° C. under a load of 2.16 kg, and mixtures thereof, wherein (A) and (B) of the polypropylene resin composition totals 100 weight parts and has undergone at least one ionization ray-irradiation treatment process, and then melting said polypropylene resin composition.

2. The polypropylene resin composition of claim 1 further comprising 0.01 to 2 weight parts of (C) selected from the group consisting of an oxide of a metal of the group 2 or the group 12 of the periodic table, a metal alkoxide represented by the following general formula (I):

$$M(R)_{m-n}(OR')_n \quad (I)$$

wherein R and R' each represents an alkyl group having a carbon number of 1 to 20, m is 3 or 4, n is an integer satisfying $m \geq n \geq 2$, and M represents B, Al, Si, or a metal atom of the group 4 or the group 5 of the periodic table, and mixtures thereof; wherein (C) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

3. The polypropylene resin composition of claim 2, wherein the ionization treatment are γ rays at an irradiation dose of from 1 to 80 kGy.

4. The polypropylene resin composition of claim 1 wherein the ionization treatment are γ rays at an irradiation dose of from 1 to 80 kGy.

5. The polypropylene resin composition of claim 1, comprising 5 to 95 weight parts of the polypropylene resin composition comprising (A) and (B), and further comprising (D) 95 to 5 weight parts of a polypropylene resin having a melt flow rate of 0.01 to 100 g/10 min measured at 230° C. under a load of 2.16 kg.

6. The polypropylene resin composition of claim 1, further comprising 0.05 to 20 weight parts of (E) a nucleating agent added to 100 weight parts of the polypropylene resin composition comprising (A) and (B), wherein (E) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

7. A polypropylene resin composition comprising (A) 99.8 to 80 weight parts of a polypropylene resin having a melt flow rate of 0.1 to 50 g/10 min measured at 230° C. under a load of 2.16 kg; and (B) 0.2 to 20 weight parts of at least one polyolefin selected from the group consisting of an olefin copolymer rubber having an intrinsic viscosity [η] of 0.5 to 4.0 dl/g, a polyethylene resin having a density of 0.895 to 0.945 g/cc and a melt flow rate of 0.05 to 15 g/10 min measured at 190° C. under a load of 2.16 kg, and mixtures thereof, wherein (A) and (B) of the polypropylene resin composition totals 100 weight parts and has undergone at least one ionization ray-irradiation treatment process, and then melting said polypropylene resin composition to form a final polypropylene resin composition, with the final polypropylene resin composition comprising a melt tension of 3 g or more.

8. The polypropylene resin composition of claim 7, wherein the melt tension is 4 g or more.

9. A process for producing a polypropylene resin composition comprising:

(A) 99.8 to 80 weight parts of a polypropylene resin having a melt flow rate of 0.1 to 50 g/10 min measured at 230° C. under a load of 2.16 kg; and (B) 0.2 to 20 weight parts of at least one polyolefin selected from the group consisting of an olefin copolymer rubber having an intrinsic viscosity [η] of 0.5 to 4.0 dl/g, a polyethylene resin having a density of 0.895 to 0.945 g/cc and a melt flow rate of 0.05 to 15 g/10 min. measured at 190° C. under a load of 2.16 kg, and mixtures thereof, wherein said process comprises mixing the polypropylene resin (A) with the at least one polyolefin (B) to form the polypropylene resin composition;

treating the polypropylene resin composition with at least one ionization ray-irradiation treatment process; and melting the polypropylene resin composition after the polypropylene resin composition is treated with at least one ionization ray-irradiation treatment process.

10. The process of claim 9, wherein 0.01 to 2 weight parts of (C), selected from the group consisting of an oxide of a metal of the group 2 or the group 12 of the periodic table, a metal alkoxide represented by the following general formula (I):

$$M(R)_{m-n}(OR')_n \qquad (I)$$

wherein R and R' each represents an alkyl group having a carbon number of 1 to 20, m is 3 or 4, n is an integer satisfying m≧n≧2, and M represents B, Al, Si, or a metal atom of the group 4 or the group 5 of the periodic table, and mixtures thereof; wherein (C) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

11. The process of claim 10, wherein the ionization ray-irradiation treatment process comprise γ rays at an irradiation dose of from 1 to 80 kGy.

12. The process of claim 9 wherein the ionization ray-irradiation treatment process comprise γ rays at an irradiation dose of from 1 to 80 kGy.

13. The process of claim 9, further comprising adding 95 to 5 weight parts of (D), a polypropylene resin having a melt flow rate of 0.01 to 100 g/10 min measured at 230° C. under a load of 2.16 kg, to 5 to 95 weight parts of the polypropylene resin composition comprising (A) and (B).

14. The process of claim 9, further comprising adding 0.05 to 20 weight parts of (E), a nucleating agent, to 100 weight parts of the polypropylene resin composition comprising (A) and (B), wherein (E) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

15. A process for producing a polypropylene resin composition comprising:

(A) 99.8 to 80 weight parts of a polypropylene resin having a melt flow rate of 0.1 to 50 g/10 min measured at 230° C. under a load of 2.16 kg; and (B) 0.2 to 20 weight parts of at least one polyolefin selected from the group consisting of an olefin copolymer rubber having an intrinsic viscosity [η] of 0.5 to 4.0 dl/g, a polyethylene resin having a density of 0.895 to 0.945 g/cc and a melt flow rate of 0.05 to 15 g/10 min. measured at 190° C. under a load of 2.16 kg, and mixtures thereof, wherein said process comprises mixing the polypropylene resin (A) with the at least one polyolefin (B) to form the polypropylene resin composition;

treating the polypropylene resin composition with at least one ionization ray-irradiation treatment process; and melting the polypropylene resin composition to form a final polypropylene resin composition after the polypropylene resin composition is treated with at least one ionization ray-irradiation treatment process, wherein the final polypropylene resin composition comprises a melt tension of 3 g or more.

16. The process of claim 15, wherein the melt tension is 4 g or more.

17. A polypropylene resin composition comprising (A) 99.8 to 80 weight parts of a polypropylene resin having a melt flow rate of 0.1 to 50 g/10 min measured at 230° C. under a load of 2.16 kg; and (B) 0.2 to 20 weight parts of at least one polyolefin selected from the group consisting of an olefin copolymer rubber having an intrinsic viscosity [η] of 0.5 to 4.0 dl/g, a polyethylene resin having a density of 0.895 to 0.945 g/cc and a melt flow rate of 0.05 to 15 g/10 min measured at 190° C. under a load of 2.16 kg, and mixtures thereof, wherein (A) and (B) of the polypropylene resin composition totals 100 weight parts and has undergone at least one ionization ray-irradiation treatment process, and then melting said polypropylene resin composition to form a final polypropylene resin composition, wherein the final polypropylene resin composition further comprises a melt flow rate of 0.1 to 20 g/10 min measured at 230° C. under a load of 2.16 kg.

18. The polypropylene resin composition of claim 17, wherein the final polypropylene resin composition further comprises a melt flow rate of 0.15 to 15 g/10 min measured at 230° C. under a load of 2.16 kg.

19. The polypropylene resin composition of claim 17, wherein the final polypropylene resin composition further comprises a melt tension of 3 g or more.

20. The polypropylene resin composition of claim 17, wherein the final polypropylene resin composition further comprise a melt tension of 4 g or more.

21. A polypropylene resin composition comprising (A) 99.8 to 80 weight parts of a polypropylene resin having a melt flow rate of 0.1 to 50 g/10 min measured at 230° C. under a load of 2.16 kg; and (B) 0.2 to 20 weight parts of at least one olefin copolymer rubber having an intrinsic viscosity [η] of 0.5 to 4.0 dl/g, wherein (A) and (B) of the polypropylene resin composition totals 100 weight parts and has undergone at least one ionization ray-irradiation treatment process, and then melting said polypropylene resin composition.

22. The polypropylene resin composition of claim 21 further comprising 0.01 to 2 weight parts of (C) selected from the group consisting of an oxide of a metal of the group 2 or the group 12 of the periodic table, a metal alkoxide represented by the following general formula (I):

$$M(R)_{m-n}(OR')_n \qquad (I)$$

wherein R and R' each represents an alkyl group having a carbon number of 1 to 20, m is 3 or 4, n is an integer satisfying m≧n≧2, and M represents B, Al, Si, or a metal atom of the group 4 or the group 5 of the periodic table, and mixtures thereof; wherein (C) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

23. The polypropylene resin composition of claim 22, wherein the ionization treatment are γ rays at an irradiation dose of from 1 to 80 kGy.

24. The polypropylene resin composition of claim 21 wherein the ionization treatment are y rays at an irradiation dose of from 1 to 80 kGy.

25. The polypropylene resin composition of claim 21, comprising 5 to 95 weight parts of the polypropylene resin composition comprising (A) and (B), and further comprising (D) 95 to 5 weight parts of a polypropylene resin having a melt flow rate of 0.01 to 100 g/10 min measured at 230° C. under a load of 2.16 kg.

26. The polypropylene resin composition of claim 21, further comprising 0.05 to 20 weight parts of (E) a nucleating agent added to 100 weight parts of the polypropylene resin composition comprising (A) and (B), wherein (E) is added to 100 weight parts of the polypropylene resin composition comprising (A) and (B) after the polypropylene resin composition comprising (A) and (B) has undergone at least one ionization ray-irradiation treatment process, and then melting the polypropylene resin composition.

\* \* \* \* \*